United States Patent
Romero (10) Patent No.: US 12,298,529 B2
(45) Date of Patent: May 13, 2025

(54) SPECTRALLY-SELECTIVE OPTICAL ELEMENT

(71) Applicant: Kevin J. Romero, Claremont, CA (US)

(72) Inventor: Kevin J. Romero, Claremont, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 418 days.

(21) Appl. No.: 17/677,016

(22) Filed: Feb. 22, 2022

(65) Prior Publication Data
US 2023/0266601 A1    Aug. 24, 2023

(51) Int. Cl.
G02B 27/42    (2006.01)

(52) U.S. Cl.
CPC ............................ G02B 27/4233 (2013.01)

(58) Field of Classification Search
CPC ............ G02B 27/4233; G02B 27/0062; G02B 27/4244; G02B 27/4272; G02B 5/1828; G02B 5/1866; G02B 5/1814; G02B 5/1842; G02B 5/1823; G02B 5/22; G02B 5/223; G02B 26/0808
USPC ......................................................... 359/576
See application file for complete search history.

(56) References Cited

U.S. PATENT DOCUMENTS

| | | | |
|---|---|---|---|
| 3,951,520 A | 4/1976 | Waring, Jr. | |
| 5,760,961 A * | 6/1998 | Tompkin | G06K 19/16 359/566 |
| 8,755,119 B2 * | 6/2014 | Ushigome | B82Y 20/00 359/576 |
| 10,802,321 B2 * | 10/2020 | Kuo | G02F 1/133504 |
| 2004/0125454 A1 * | 7/2004 | Kawasaki | G02B 5/1866 359/569 |
| 2006/0176559 A1 * | 8/2006 | Minoda | G11B 7/1275 359/558 |
| 2012/0200925 A1 | 8/2012 | Iwasa et al. | |

FOREIGN PATENT DOCUMENTS

EP    1361461 A1    11/2003

OTHER PUBLICATIONS

WOISR—International Search Report and Written Opinion for corresponding PCT/US2023/011139, mailed Sep. 7, 2023, received Feb. 16, 2024.

* cited by examiner

*Primary Examiner* — Jyotsna V Dabbi
(74) *Attorney, Agent, or Firm* — Tarolli, Sundheim, Covell & Tummino LLP (57) ABSTRACT

An optical element includes a first optical material structure comprising a first index of refraction across a frequency spectrum. The optical element also includes a second optical material structure configured to exhibit an index anomaly corresponding to a change in index of refraction from the first index of refraction to a second index of refraction across a portion of the frequency spectrum and a change from the second index of refraction to the first index of refraction along the frequency spectrum. The optical element further includes a diffractive interface corresponding to a non-planar material contact junction between the first optical material structure and the second optical material structure. The diffractive interface can be configured to manipulate in a predetermined manner an optical beam having an optical path through the diffractive interface and having a frequency in the portion of the frequency spectrum.

23 Claims, 4 Drawing Sheets

SPECTRALLY-SELECTIVE OPTICAL ELEMENT

TECHNICAL FIELD

The present disclosure relates generally to optical systems, and specifically to a spectrally-selective optical element.

BACKGROUND

Manipulating electromagnetic waves is becoming increasingly more prevalent in a variety of technologies, including healthcare, remote sensing, navigation, and communications. Optical systems may require functionality of manipulating optical waves over a broad frequency spectrum, but often only selected bands within this range are required for the intent of the instrument. Optical systems may take advantage of optical phenomena in order to manipulate the electromagnetic waves. For example, the Christiansen effect describes the reduction in scattering observed when dissimilar materials have the same index of refraction. However, when the index of refractions differ between two surfaces of approximately the same material, scattering and optical wavefront interaction with the interface between those surfaces is enhanced in a way that is proportional to the index difference between the surfaces. Diffractive optical control structures that implement the Christiansen effect typically only perform a useful function over the diffractive optical bandwidth relative to the useful range of refractive optical systems. Outside of the high efficiency diffractive band, a given diffractive optical control structure may actually degrade the optical performance of the overall optical system, such as acting as a scattering source contributing to background noise of the associated optical instrument.

SUMMARY

One example includes an optical element. The optical element includes a first optical material having a first index of refraction across a frequency spectrum. The optical element also includes a second optical material structure configured to exhibit an index anomaly corresponding to a change in index of refraction from the first index of refraction to a second index of refraction across a portion of the frequency spectrum and a change from the second index of refraction to the first index of refraction along the frequency spectrum. The optical element further includes a diffractive interface corresponding to a non-planar material contact junction between the first optical material structure and the second optical material structure. The interface can be configured to manipulate in a predetermined manner an optical beam having an optical path through the diffractive interface and having a frequency in the portion of the frequency spectrum.

Another example includes a method for manufacturing an optical element. The method includes providing a first optical material structure formed of a substrate material and comprising a first index of refraction across a frequency spectrum and providing a second optical material structure formed of the substrate material. The method also includes introducing an index-affecting impurity into the second optical material structure to facilitate exhibition of an index anomaly corresponding to a change in index of refraction from the first index of refraction to a second index of refraction across a portion of the frequency spectrum and a change from the second index of refraction to the first index of refraction along the frequency spectrum. The method also includes forming an optically-diffractive structure on a surface of one of the first and second optical material structures, and forming a complementary structure on a surface of the other of the first and second optical material structures. The method further includes joining the first and second optical material structures via the surfaces of the first and second optical material structures to form a diffractive interface between the first and second optical material structures. The diffractive interface can be configured to manipulate in a predetermined manner an optical beam having an optical path through the diffractive interface and having a frequency in the portion of the frequency spectrum.

Another example includes an optical system. The system includes a first optical element in an optical path of an optical beam. The first optical element includes a first optical material structure comprising a first index of refraction across a frequency spectrum. The first optical element also includes a second optical material structure configured to exhibit a first index anomaly corresponding to a change in index of refraction from the first index of refraction to a second index of refraction across a first portion of the frequency spectrum and a change from the second index of refraction to the first index of refraction along the frequency spectrum. The first optical element further includes a first diffractive interface corresponding to a first non-planar material contact junction between the first optical material structure and the second optical material structure. The first diffractive interface can be configured to manipulate in a predetermined manner the optical beam and having a frequency in the first portion of the frequency spectrum. The system also includes a second optical element in the optical path of the optical beam. The second optical element includes a third optical material structure comprising the first index of refraction across the frequency spectrum. The second optical element also includes a fourth optical material structure configured to exhibit a second index anomaly corresponding to a change in index of refraction from the first index of refraction to a third index of refraction across a second portion of the frequency spectrum and a change from the third index of refraction to the first index of refraction along the frequency spectrum. The second optical element further includes a second diffractive interface corresponding to a second non-planar material contact junction between the third optical material structure and the fourth optical material structure. The second diffractive interface can be configured to manipulate in a predetermined manner the optical beam and having a frequency in the second portion of the frequency spectrum.

DETAILED DESCRIPTION

The present disclosure relates generally to optical systems, and specifically to a spectrally-selective optical element. The spectrally-selective optical element (hereinafter "optical element") can be fabricated to include a first optical material structure and a second optical material structure, with each of the optical material structures corresponding to a same substrate material. The second optical material structure can include an index-affecting impurity that can facilitate exhibition of an index anomaly. As described herein, the term "index anomaly" corresponds to a change in the index of refraction from the nominal index of refraction of a substrate material over a well-defined spectral range. Such index anomalies can be created in a variety of ways, but typically by incorporating an absorption feature at a lower wavelength of light from the desired location of an index anomaly. The difference can be determined, for example, by the Kramers-Kronig relation.

As an example, the diffractive efficiency for an optical element, such as a diffractive optical element (DOE) can depend on the center design wavelength $\lambda_0$ and the order of diffraction, m, where m ranges from 1 to $\infty$ and the wavelength of light, such as described by:

$$\varepsilon_{mth}(\lambda_0, \lambda, m) := \left[ \frac{\sin\left[\pi \cdot \left(\frac{\lambda_0}{\lambda} - m\right)\right]^2}{\left[\pi \cdot \left(\frac{\lambda_0}{\lambda} - m\right)\right]^2} \right]^{\blacksquare}$$

Equation 1

For any given substrate material, absorption features can generate extinction within the material. For example, the Kramers-Kronig relationship can ensure that these absorption features also manifest themselves as index of refraction change in the material. Many materials have dispersion relationships that are well described by the Sellmeier or Cauchy dispersion models. In the field of ellipsometry, these dispersion models can often be augmented by distributions associated with dispersion phenomena caused by specific absorption features. In such cases, the total dispersion curves may often incorporate Lorentzian distributions in order to capture the index change of the material immediately after a strong absorption feature. For example, an index anomaly can force the optical element (e.g., DOE) to only operate near the desired absorption band.

The product of Lorentzian distributions (e.g., due to the absorber) and the diffractive optical efficiency provides the efficiency of the resultant optical element. To model likely index anomalies, the Lorentzian's amplitude can be scaled by the magnitude of the index of refraction change (e.g., $\Delta n(\lambda) = n_2(\lambda) - n_1(\lambda)$, where $\lambda$ indicates the spectral dependence of the index of refraction of medium 1 and 2). The magnitude of the index change can indicate the strength of the interaction of the wavefront and the diffractive surface of the optical element. When this difference is negligible, the performance of the optical element can be dominated by behavior as a refractive element. Examples of such an optical element can be simple or as a window or as complex as a telescope's aspheric corrector plate, a beam director, or an imaging lens.

In the described optical element, the first index of refraction corresponding to a nominal index of refraction of the substrate material to a second index of refraction across a portion of the frequency spectrum, followed by a change back to the first index of refraction along the frequency spectrum. Therefore, the second optical material structure can exhibit a different index of refraction for wavelengths of an optical beam (e.g., at a wave front of the optical beam) having a wavelength in the portion of the frequency spectrum. As described herein, the terms "wavelength" and "frequency" are used interchangeably due to the inversely proportional relationship between wavelength and frequency. Therefore, the wavelength of the optical beam is described as residing in the frequency spectrum, and the frequency spectrum is described herein in terms of wavelength.

The first and second optical material structures can be arranged as flush in contact with each other. Therefore, based on the combination of the first and second optical material structures, optical beams that pass through the first and second optical material structures can be subject to the Christiansen Effect. Therefore, optical beams having a wavelength outside of the portion of the frequency spectrum can be unaffected by the optical element. However, optical beams having a wavelength in the portion of the frequency spectrum can be subject to scattering (e.g., interaction) between the surfaces based on the difference in index of refraction between the first and second optical material structures.

The optical element includes a diffractive interface corresponding to a non-planar material contact junction between the first optical material structure and the second optical material structure. The diffractive interface can manipulate optical beams that are in the portion of the frequency spectrum where the index of refraction differs significantly between the substrate and doping materials. As an example, the optical element can be spectrally selective with respect to providing a coherent interaction with the optical element resulting from the Christiansen Effect based on exhibiting a minimal scattering between two surfaces with the same index of refraction and maximum interaction when the index of refraction between the substrates is maximum. As a result, the dispersion of light exhibited by the substrate and the doped substrate can be approximately the same everywhere but in the spectral vicinity of the index anomaly.

For example, the diffractive interface can be a diffractive optical element or holographic optical element, corresponding to a wide variety of equivalent optical elements such as lenses (e.g., concave or convex surface lenses), gratings, polarizers, occulting masks, or any other diffractive surface configured to provide a predetermined manipulation of the optical wave front. As an example, the diffractive interface can have a diffractive efficiency greater than a predetermined threshold (e.g., approximately 95%) in a region corresponding to the index anomaly. The interaction of light with the surface is substantially dominated by the diffractive surface only where the dispersion differs between the surfaces.

Therefore, the optical element can provide a predetermined manipulation of the optical beam having a wavelength in the portion of the frequency spectrum, and can be substantially transparent to the optical beam having a wavelength outside of the portion of the frequency spectrum. Additionally, multiple separate optical elements, each having an index anomaly associated with separate portions of the frequency spectrum, can be implemented in an optical system, such that different portions of the frequency spectrum of the optical beam can be affected.

Figure 1:
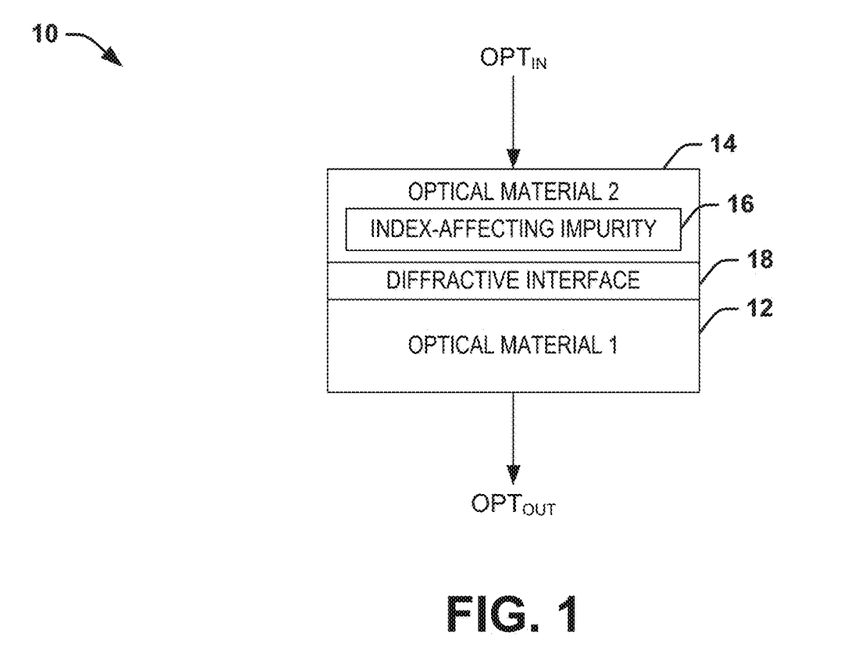
FIG. 1 illustrates an example diagram of an optical element.

FIG. 1 illustrates an example diagram of an optical element 10. The optical element 10 can be implemented in any of a variety of optical systems that can implement optical imaging. As described herein, the term "optical" with reference to an optical system, optical beam, and/or optical imaging can refer to manipulation of electromagnetic radiation across a very large frequency spectrum (e.g., from less than very long wavelength infrared (VLWIR) to greater than ultraviolet (UV)), and is therefore not limited to the visible spectrum.

The optical element 10 includes a first optical material structure 12 and a second optical material structure 14. The first optical material structure 12 has a first index of refraction across a frequency spectrum associated with an input optical beam, demonstrated in the example of FIG. 1 as $OPT_{IN}$. As an example, the input optical beam $OPT_{IN}$ can have one or more wavelengths and can have an optical path through the optical element 10. The second optical material structure 14 includes an index-affecting impurity 16 that is configured to exhibit an index anomaly associated with the index of refraction of the second optical material structure 14. The index anomaly can correspond to a change in index of refraction from the first index of refraction to a second index of refraction across a portion of the frequency spectrum, and also a change from the second index of refraction to the first index of refraction along the frequency spectrum. Therefore, as described in greater detail herein, the index anomaly can provide diffraction of the optical beam $OPT_{IN}$ based on the Christiansen Effect.

For example, the first optical material structure 12 and the second optical material structure 14 can each comprise a same substrate material (e.g., any of a variety of types of glass or glass oxide), such that the first and second optical material structures 12 and 14 can exhibit a same nominal index of refraction. The index-affecting impurity 16 can correspond to any of a variety of materials that can be introduced into the substrate material of the second optical material structure 14 to introduce the index anomaly in the predetermined portion of the frequency spectrum. For example, the index-affecting impurity 16 can correspond to a dopant material, a dye, embedded nano-particle absorber, an implanted ion or any other type of material that is incorporated into the substrate material of the second optical material structure 14 to introduce the index anomaly. Therefore, the first and second optical material structures 12 and 14 can exhibit approximately the same index of refraction along the frequency spectrum except for at the predetermined portion of the frequency spectrum corresponding to the index anomaly, at which the index of refraction of the first and second optical material structures 12 and 14 is different. As another example, one of the optical material structures 12 and 14 can be formed from an electro-optic material to provide electro-optic control of the index of refraction of the respective one of the optical material structures.

The optical element 10 also includes a diffractive interface 18 that corresponds to a contact junction of the first and second optical material structures 12 and 14. As described herein, the diffractive interface 18 is not itself a physical component, but instead refers to the flush physical contact interface of the opposing surfaces of the first and second optical material structures 12 and 14. For example, the diffractive interface 18 can correspond to any of a variety of geometric physical surfaces to provide optical manipulations of the first and second optical material structures, such as a lens (e.g., concave or convex surface), grating, polarizer, diffractive optical element, holographic optical element, or any other diffractive surface configured to provide a predetermined diffraction of the optical beam $OPT_{IN}$. Therefore, the diffractive interface 18 corresponds to a non-planar material contact junction associated with the surface of the second optical material structure 14 and the complementary surface of the first optical material structure 12.

As an example, the diffractive interface 18 can be fabricated based on physical optics to have a diffraction efficiency that is greater than a predetermined threshold at a portion of the frequency spectrum that is approximately matched to the portion of the frequency spectrum of the index anomaly. Therefore, the diffractive interface 18 is arranged to manipulate the optical beam $OPT_{IN}$ having wavelengths that reside in the predetermined portion of the frequency spectrum in a predetermined manner. As described herein, the term "manipulate the optical beam" refers to any of a variety of diffraction-related manipulation, such as focusing (e.g., as a lens), directing, polarizing, filtering, or any other type of optical manipulation. Therefore, an output optical beam $OPT_{OUT}$ can be provided at an output of the optical element 10, such that the output optical beam $OPT_{OUT}$ can exhibit the optical manipulation of the optical beam $OPT_{IN}$ in the wavelengths of the portion of the frequency spectrum based on the combination of the index anomaly and the diffractive interface 18.

Figure 2:
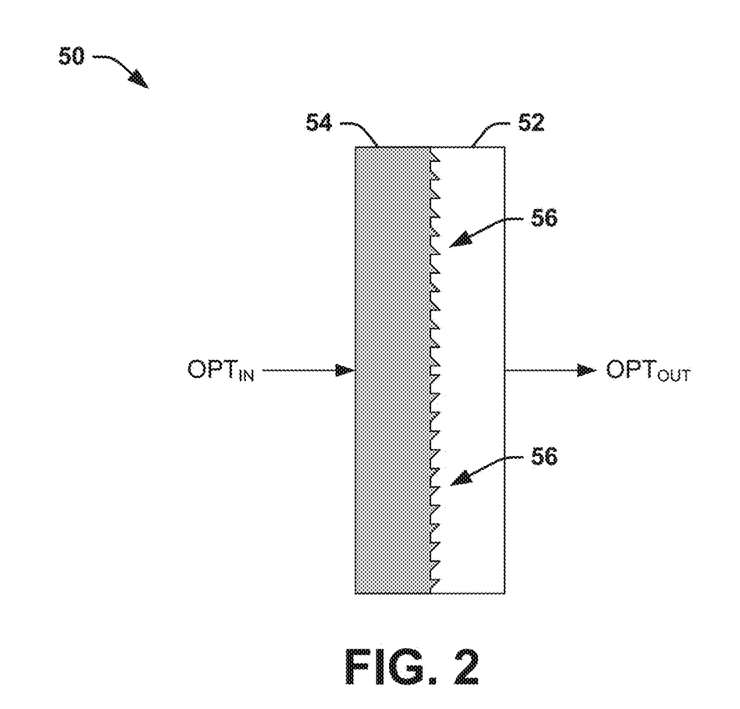
FIG. 2 illustrates another example diagram of an optical element.

FIG. 2 illustrates another example diagram of an optical element 50. The optical element 50 can be implemented in any of a variety of optical systems that can implement optical imaging. The optical element 50 is demonstrated in the example of FIG. 2 as a diagram of the optical element 10 in the example of FIG. 1. Therefore, reference is to be made to the example of FIG. 1 in the following description of the example of FIG. 2.

The optical element 50 includes a first optical material structure 52 and a second optical material structure 54. The first optical material structure 52 has a first index of refraction across a frequency spectrum associated with the input optical beam $OPT_{IN}$. The second optical material structure 54 is demonstrated as shaded in the example of FIG. 2 to demonstrate the inclusion of an index-affecting impurity that is configured to exhibit an index anomaly associated with the index of refraction of the second optical material structure 54.

For example, the first optical material structure 52 and the second optical material structure 54 can each comprise a same substrate material, such that the first and second optical material structures 52 and 54 can exhibit a same nominal index of refraction. The index-affecting impurity can thus introduce the index anomaly in the predetermined portion of the frequency spectrum. Therefore, the first and second optical material structures 52 and 54 can exhibit approximately the same index of refraction along the frequency spectrum except for at the predetermined portion of the frequency spectrum corresponding to the index anomaly, at which the index of refraction of the first and second optical material structures 52 and 54 is different.

The optical element 50 also includes a diffractive interface 56 that corresponds to a contact junction of the first and second optical material structures 52 and 54. In the example of FIG. 2, the diffractive interface 56 is demonstrated as a grating that is etched onto a surface of one of the first and second optical material structures 52 and 54. As an example, the other of the first and second optical material structures 52 and 54 can be applied to the etched surface, such as via a melting or sputtering process, to provide the complementary surface of the other of the first and second optical material structures 52 and 54 to provide the diffractive interface 56. However, alternative methods of providing the flush contact of the first and second optical material structures 52 and 54 can be provided to form the diffractive interface 56 between the first and second optical material structures 52 and 54.

As an example, the diffractive interface 56 can be fabricated to have a diffraction efficiency that is greater than a predetermined threshold (e.g., approximately 95%) at a portion of the frequency spectrum that is approximately matched to the portion of the frequency spectrum of the index anomaly. As an example, the fabrication of the diffractive interface 56 can involve providing physical characteristics of the diffractive interface 56 (e.g., with respect to dimensions of a grating or other physical aspect of the diffractive interface 56) that affect a specific band of the frequency spectrum, with the specific band corresponding approximately to the portion of the frequency spectrum of the index anomaly. As an example, the diffractive interface 56 can be patterned to provide a diffractive bandpass $\Delta\lambda$, starting at a wavelength $\lambda_I$, that is defined as follows:

$$\Delta\lambda = \frac{6}{\pi}\sqrt{1 - PT}\,\lambda_I \qquad \text{Equation 2}$$

Where: PT corresponds to the predetermined threshold of the diffraction efficiency.

For example, the diffractive interface 56 can be patterned onto a surface of one of the first and second optical material structures 52 and 54 in a predetermined manner to provide the diffraction efficiency above the predetermined threshold at a location on the frequency spectrum that is approximately equal to the predetermined portion of the frequency spectrum of the index anomaly. As another example, the index-affecting impurity can be introduced into the second optical material structure 54 in a predetermined manner to exhibit the index anomaly at a location on the frequency spectrum that is approximately equal to the predetermined portion of the frequency spectrum of the diffraction efficiency of the diffractive interface 56 being greater than the predetermined threshold.

The diffractive interface 56 is therefore arranged to manipulate the optical beam $OPT_{IN}$ having wavelengths that reside in the predetermined portion of the frequency spectrum in a predetermined manner. Therefore, an output optical beam $OPT_{OUT}$ can be provided at an output of the optical element 50, such that the output optical beam $OPT_{OUT}$ can exhibit the optical manipulation of the optical beam $OPT_{IN}$ in the wavelengths of the portion of the frequency spectrum based on the combination of the index anomaly and the diffractive interface 56.

As a result, the optical element 50 can be configured to correct any of a variety of optical aberrations in an optical system, such as spherical and/or chromatic aberrations, or can be implemented to provide selective polarization, filtering, or optical path-redirection of the portion of the optical beam $OPT_{IN}$. Additionally, because the optical element 50 is spectrally-selective with respect to the portion of the frequency band while transparent to all other wavelengths on the frequency spectrum. Therefore, the optical element 50 can be included in an optical system to correct wavelengths in the portion of the frequency band without detrimentally affecting any other portions of the frequency band as is typically the case for the inclusion of other types of correcting optics in typical optical systems. Furthermore, because the optical element 50 is formed from just two substrate material structures, the optical element 50 is significantly smaller and lighter than typical optical correction devices.

Figure 3:
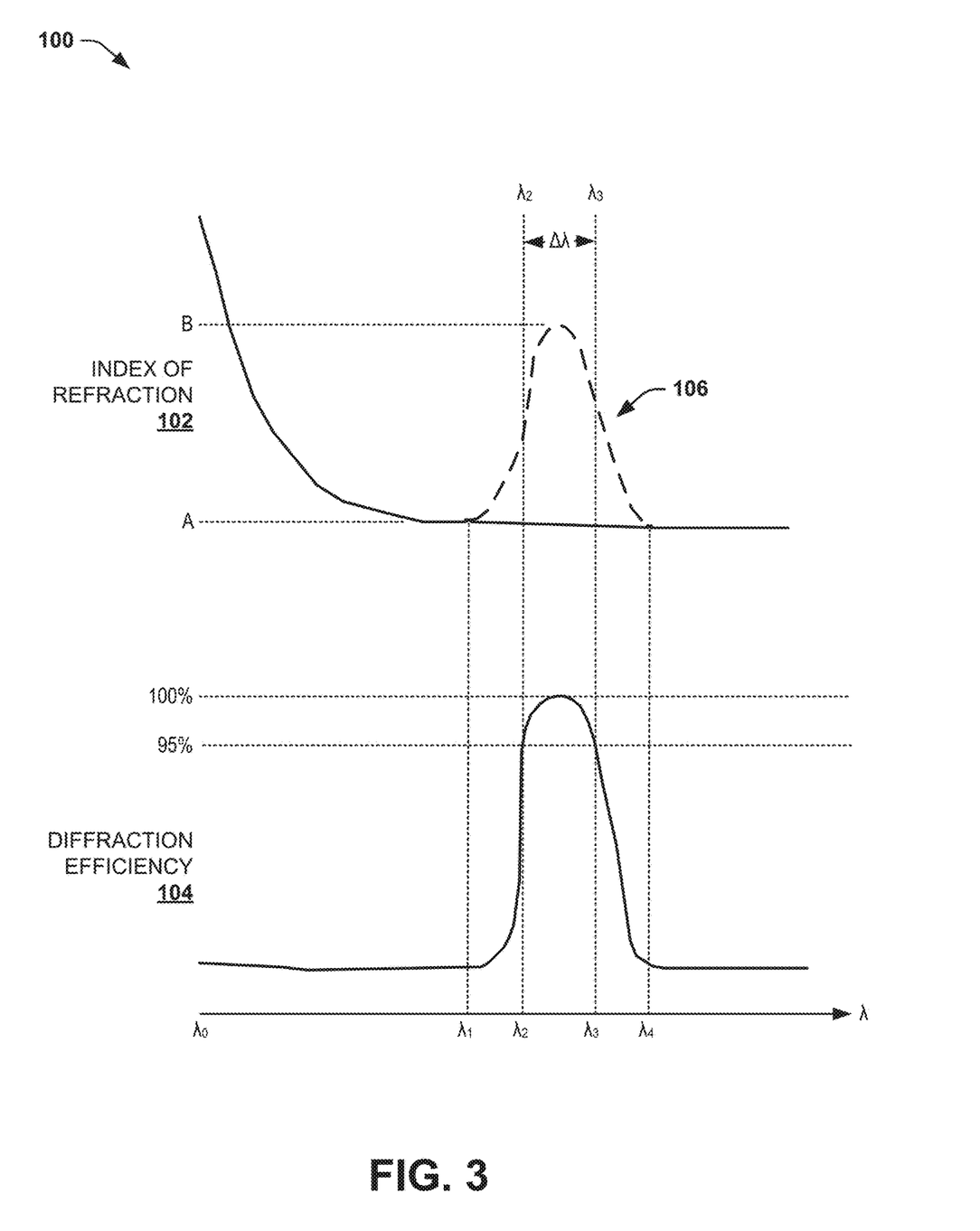
FIG. 3 illustrates an example diagram of a graph of index of refraction and a graph of diffraction efficiency of an optical element.

FIG. 3 illustrates an example diagram 100 of a graph of index of refraction, demonstrated generally at 102, and a graph of diffraction efficiency, demonstrated generally at 104, of an optical element. As an example, the index of refraction graph 102 and the diffraction efficiency graph 104 can correspond to the optical element 10 and/or the optical element 50 in the respective examples of FIGS. 1 and 2. Therefore, reference is to be made to the examples of FIGS. 1 and 2 in the following example of FIG. 3.

The diagram 100 demonstrates a frequency spectrum, demonstrated in terms of wavelength $\lambda$, along which the graph of index of refraction 102 and the graph of diffraction efficiency 104 are plotted. The frequency spectrum $\lambda$ begins at a wavelength $\lambda_0$ corresponding to a longest wavelength on the frequency spectrum $\lambda$ and increasing in frequency/decreasing in wavelength. The graph of index of refraction 102 demonstrates the refractive index of the each of the first and second optical material structures 52 and 54, where the refractive index of the first optical material structure 52 is demonstrated as a solid line and the refractive index of the second optical material structure 54 is demonstrated as a dashed line. Beginning at the wavelength $\lambda_0$, the refractive indices of the respective first and second optical material structures 52 and 54 is approximately equal and decreases from an initial value down to a nominal value "A".

At a wavelength of $\lambda_1$, the index of refraction of the second optical material structure 54 increases relative to the refractive index of the first optical material structure 52. The difference in index of refraction between the first and second optical material structures 52 and 54 can be based on the introduction of an index anomaly, demonstrated in the example of FIG. 3 at 106, in the second optical material structure 54 by the index-affecting impurity. Therefore, despite the first and second optical material structures 52 and 54 being fabricated from a same substrate material, the second optical material structure 54 can have a different index of refraction in a portion of the frequency spectrum $\lambda$ relative to the first optical material structure 52 based on the index-affecting impurity. As a result, the optical beam $OPT_{IN}$ can be subject to the Christiansen Effect in the portion of the frequency spectrum $\lambda$ corresponding to the index anomaly 106. The index of refraction of the second optical material structure 54 is demonstrated as increasing to a maximum value "B" before decreasing back to approximately the value "A" at a wavelength of $\lambda_4$. The refractive index of the first optical material structure 52 remains approximately constant between the wavelengths $\lambda_1$ and $\lambda_4$. At frequencies greater than the wavelength $\lambda_4$, and thus wavelengths less than the wavelength $\lambda_4$, the refractive index of the first and second optical material structures 52 and 54 is approximately the same.

As described previously, the diffraction interface 56 can be patterned to provide a diffraction efficiency that is greater than a predetermined threshold for a portion of the frequency spectrum $\lambda$. In the example of FIG. 3, the diffraction interface 56 can be fabricated in a predetermined manner to provide a diffraction efficiency of greater than a predetermined threshold, demonstrated in the example of FIG. 3 as approximately 95%, for a portion of the frequency spectrum $\lambda$. In the example of FIG. 3, the portion of the frequency spectrum $\lambda$ at which the diffraction efficiency is approximately greater than 95% is between a wavelength $\lambda_2$ and a wavelength $\lambda_3$, thus defining a diffractive bandpass $\Delta\lambda$ of the diffraction interface 56. As an example, the diffraction interface 56 can have been fabricated such that the diffractive bandpass $\Delta\lambda$ is approximately centered at the index anomaly 106. As a result, the diffraction interface 56 and the index anomaly 106 cooperate to manipulate the wavelengths of the optical beam $OPT_{IN}$ in the diffractive bandpass $\Delta\lambda$.

As described previously, the optical element 50 can correspond to one of a plurality of optical elements in an optical system. As an example, multiple optical elements 50 can be implemented in an optical system to affect multiple different portions of the frequency band, such as to correct optical aberrations in different portions of the frequency band. Therefore, a plurality of optical elements 50 can be implemented along a given optical path to affect a respective plurality of different portions of the frequency spectrum $\lambda$.

Figure 4:
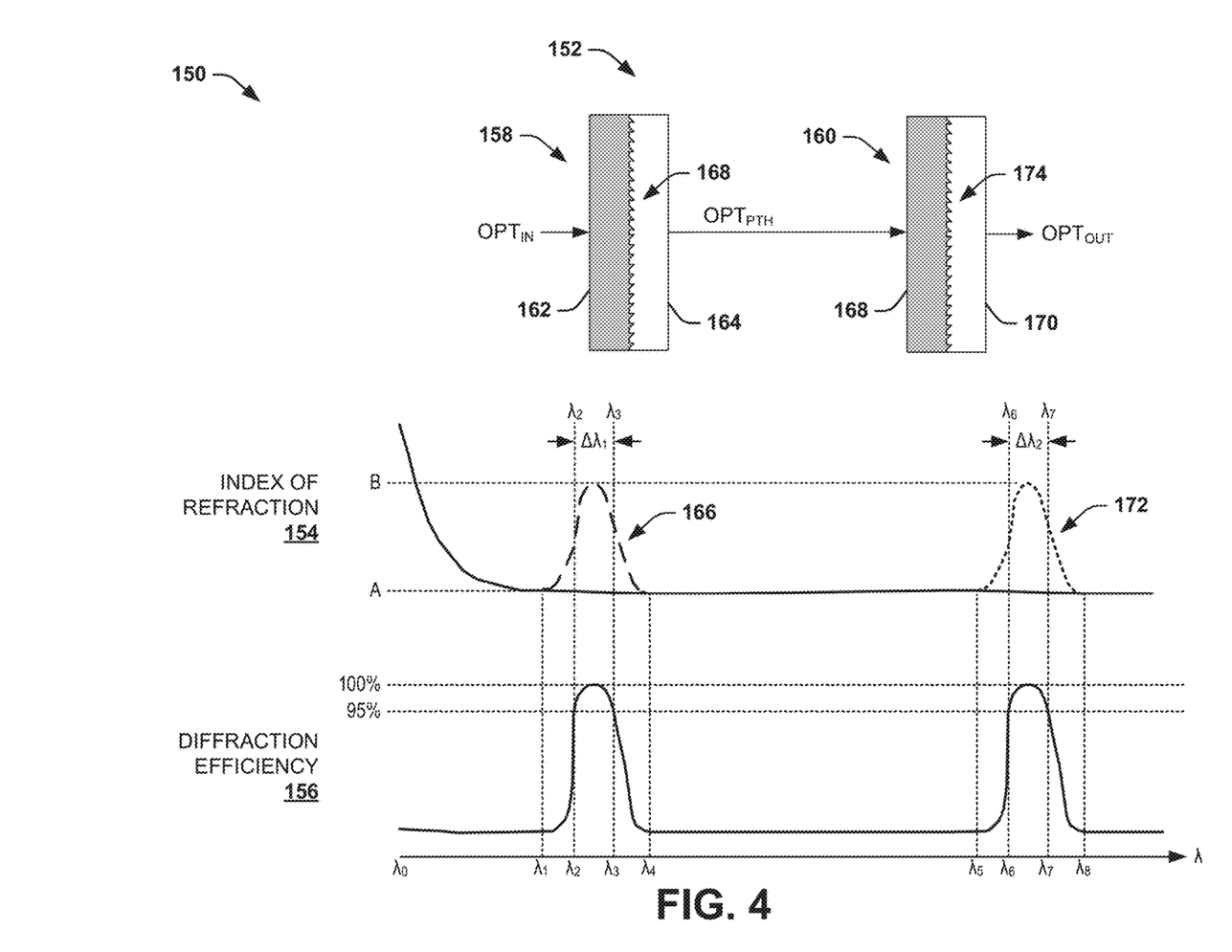
FIG. 4 illustrates an example diagram of an optical system and corresponding graphs of index of refraction and diffraction efficiency of the optical system.

FIG. 4 illustrates an example diagram 150 of an optical system 152 and corresponding graphs of index of refraction, demonstrated generally at 154, and diffraction efficiency, demonstrated generally at 156. The optical system 152 can be implemented in any of a variety of optical imaging environments. In the example of FIG. 4, the optical system 152 includes a first optical element 158 and a second optical element 160 in an optical path of an input optical beam $OPT_{IN}$. As described herein, the optical elements 158 and 160 can provide selective optical manipulation for separate respective portions of a frequency spectrum $\lambda$.

The optical element 158 includes a first optical material structure 162 and a second optical material structure 164. The first optical material structure 162 has a first index of refraction across the frequency spectrum $\lambda$. The second optical material structure 164 is demonstrated as shaded in the example of FIG. 4 to demonstrate the inclusion of an index-affecting impurity that is configured to exhibit an index anomaly, demonstrated at 166 in the graph 154, associated with the index of refraction of the second optical material structure 164. The optical element 158 also includes a diffractive interface 168 that corresponds to a contact junction of the first and second optical material structures 162 and 164. The diffractive interface 168 can have a diffractive bandpass $\Delta\lambda_1$ that is substantially matched to the index anomaly 166. Therefore, the optical element 158 is arranged substantially similar to the optical element 50 in the example of FIG. 2. The first optical element 158 can provide an intermediate optical beam $OPT_{PTH}$ that is based on the input optical beam $OPT_{IN}$, such as based on optical manipulation of the wavelengths in the diffractive bandpass $\Delta\lambda_1$ that is substantially matched to the index anomaly 166.

Similarly, the optical element 160 includes a first optical material structure 168 and a second optical material structure 170. The first optical material structure 168 has the first index of refraction across the frequency spectrum $\lambda$. The second optical material structure 170 is demonstrated as shaded in the example of FIG. 4 to demonstrate the inclusion of an index-affecting impurity that is configured to exhibit an index anomaly, demonstrated at 172 in the graph 154, associated with the index of refraction of the second optical material structure 170. As an example, the index-affecting impurity in the second optical material structure 170 can be different from index affecting impurity in the second optical material structure 164 to provide the index anomaly 172 at a different portion of the frequency spectrum $\lambda$. The optical element 160 also includes a diffractive interface 174 that corresponds to a contact junction of the first and second optical material structures 168 and 170. The diffractive interface 174 can have a diffractive bandpass $\Delta\lambda_2$ that is substantially matched to the index anomaly 172. As an example, the physical characteristics of the diffractive interfaces 168 and 174 can be substantially different to result in a diffractive bandpass $\Delta\lambda_1$ that is different from the diffractive bandpass $\Delta\lambda_2$, and thus resulting in the diffractive bandpasses $\Delta\lambda_1$ and $\Delta\lambda_2$ being non-overlapping. Therefore, the optical element 160 is arranged substantially similar to the optical element 50 in the example of FIG. 2. The second optical element 160 can provide an output optical beam $OPT_{OUT}$ that is based on the intermediate optical beam $OPT_{PTH}$, such as based on optical manipulation of the wavelengths in the diffractive bandpass $\Delta\lambda_2$ that is substantially matched to the index anomaly 172.

Similar to as described previously, the diagram 150 demonstrates the graph of index of refraction 162 and the graph of diffraction efficiency 164 plotted with respect to the frequency spectrum $\lambda$. The frequency spectrum $\lambda$ begins at a wavelength $\lambda_0$ corresponding to a longest wavelength on the frequency spectrum $\lambda$ and increasing in frequency/decreasing in wavelength. The graph of index of refraction 162 demonstrates the refractive index of the each of the optical material structures 162 and 164 and the optical material structures 168 and 170, where the refractive index of the optical material structures 162 and 168, corresponding to the nominal refractive index of the substrate material of the optical material structures 162, 164, 168, and 170, is demonstrated as a solid line, the refractive index of the optical material structure 164 is demonstrated as a dashed line, and the refractive index of the optical material structure 170 is demonstrated as a dotted line. Beginning at the wavelength $\lambda_0$, the refractive indices of the respective optical material structures 162, 164, 168, and 170 is approximately equal and decreases from an initial value down to a nominal value "A".

At a wavelength of $\lambda_1$, the index of refraction of the optical material structure 164 increases relative to the refractive index of the optical material structures 162, 168, and 170. The difference in index of refraction between the optical material structure 164 and the optical material structures 162, 168, and 170 can be based on the introduction of an index anomaly 166. The index of refraction of the optical material structure 164 is demonstrated as increasing to a maximum value "B" before decreasing back to approximately the value "A" at a wavelength of $\lambda_4$. The refractive index of the optical material structures 162, 168, and 170 remains approximately constant between the wavelengths $\lambda_1$ and $\lambda_4$. At a wavelength of $\lambda_5$, the index of refraction of the optical material structure 170 increases relative to the refractive index of the optical material structures 162, 164, and 168. The difference in index of refraction between the optical material structure 170 and the optical material structures 162, 164, and 168 can be based on the introduction of an index anomaly 172. The index of refraction of the optical material structure 170 is demonstrated as increasing to a maximum value "B" before decreasing back to approximately the value "A" at a wavelength of $\lambda_8$. The refractive index of the optical material structures 162, 164, and 168 remains approximately constant between the wavelengths $\lambda_5$ and $\lambda_8$. It is to be understood that the increase in the refractive index is not limited to being equal (e.g., the maximum value "B") for each of the index anomalies 166 and 172, but could instead be different values based on the different index-affecting impurities.

As described previously, the diffraction interfaces 168 and 174 can each be patterned to provide respective diffraction efficiencies that are greater than a predetermined threshold for respective portions of the frequency spectrum $\lambda$. In the example of FIG. 4, the diffraction interfaces 168 and 174 can each be fabricated in respective predetermined manners to provide diffraction efficiencies of greater than a predetermined threshold, demonstrated in the example of FIG. 4 as approximately 95%, for separate respective portions of the frequency spectrum $\lambda$.

In the example of FIG. 4, the portion of the frequency spectrum $\lambda$ at which the diffraction efficiency of the diffraction interface 168 is approximately greater than 95% is between a wavelength $\lambda_2$ and a wavelength $\lambda_3$, thus defining the diffractive bandpass $\Delta\lambda_1$ of the diffraction interface 168. Similarly, the portion of the frequency spectrum λ at which the diffraction efficiency of the diffraction interface 174 is approximately greater than 95% is between a wavelength $\lambda_6$ and a wavelength $\lambda_7$, thus defining the diffractive bandpass $\Delta\lambda_2$ of the diffraction interface 174. As an example, the diffraction interface 168 can have been fabricated such that the diffractive bandpass $\Delta\lambda_1$ is approximately centered at the index anomaly 166, and the diffraction interface 174 can have been fabricated such that the diffractive bandpass $\Delta\lambda_2$ is approximately centered at the index anomaly 174. As a result, the diffraction interface 168 and the index anomaly 166 cooperate to manipulate the wavelengths of the optical beam $OPT_{IN}$ in the diffractive bandpass $\Delta\lambda_1$, and the diffraction interface 174 and the index anomaly 172 cooperate to manipulate the wavelengths of the optical beam $OPT_{PTH}$ in the diffractive bandpass $\Delta\lambda_2$.

The optical system 152 is not limited to only two optical elements 154 and 156, but could instead include one or more additional optical elements that are each associated with separate portions of the frequency spectrum λ, and can be associated with one or more separate optical paths of optical systems. Therefore, multiple spectral aberrations can be selectively corrected and/or introduced in the respective associated optical system. Accordingly, the optical elements described herein can be implemented in a flexible manner to provide desired optical results across the frequency spectrum λ.

Figure 5:
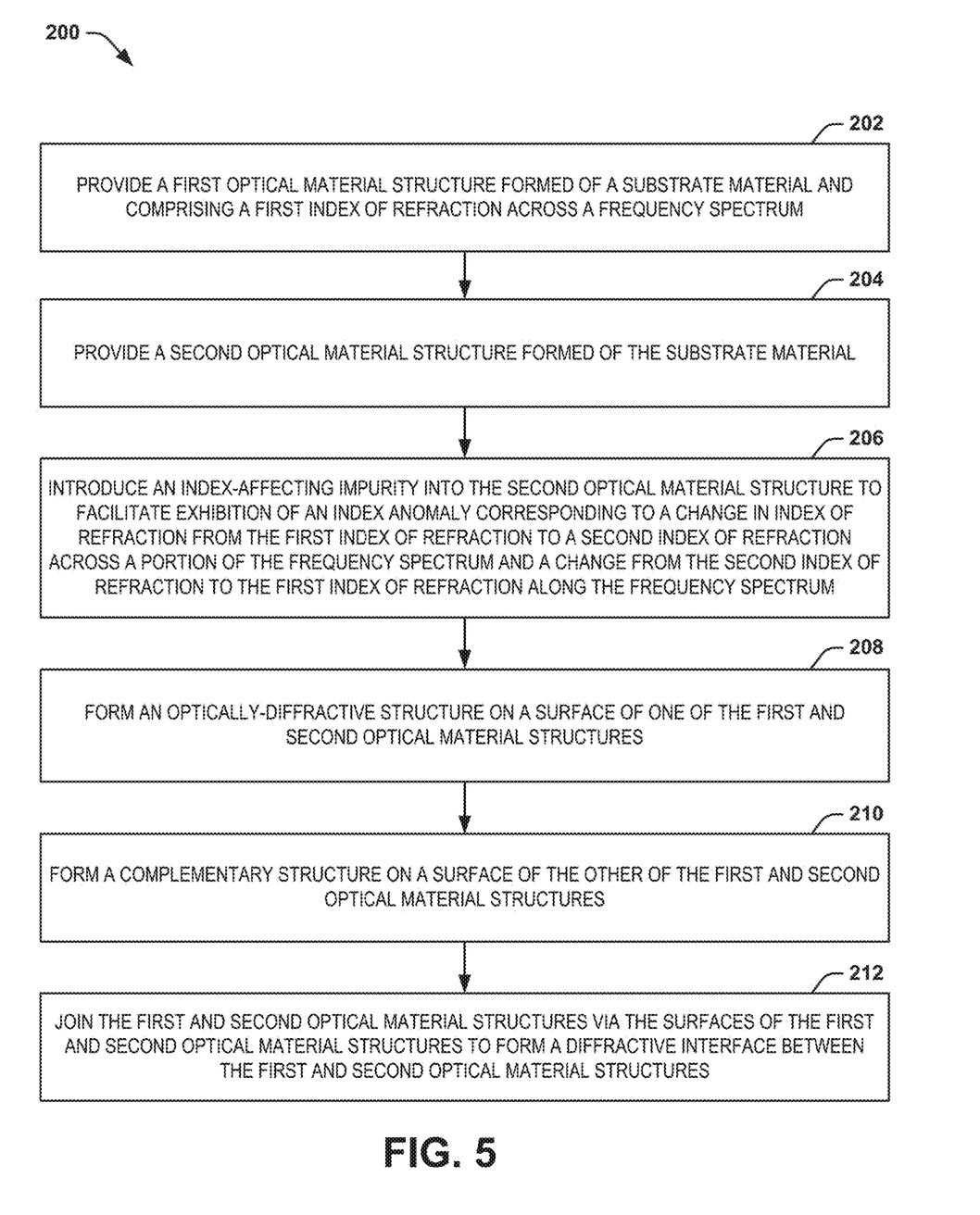
FIG. 5 illustrates an example of a method for manufacturing an optical element.

In view of the foregoing structural and functional features described above, a methodology in accordance with various aspects of the example embodiments will be better appreciated with reference to FIG. 5. While, for purposes of simplicity of explanation, the methodologies of FIG. 5 are shown and described as executing serially, it is to be understood and appreciated that the example embodiments are not limited by the illustrated order, as some aspects could, in accordance with the example embodiments, occur in different orders and/or concurrently with other aspects from that shown and described herein. Moreover, not all illustrated features may be required to implement a methodology in accordance with an aspect of the example embodiments.

FIG. 5 illustrates an example of a method 200 for manufacturing an optical element (e.g., the optical element 10). At 202, a first optical material structure (e.g., the first optical material structure 12) formed of a substrate material and comprising a first index of refraction across a frequency spectrum (e.g., the frequency spectrum λ) is provided. At 204, a second optical material structure (e.g., the second optical material structure 14) formed of the substrate material is provided. At 206, an index-affecting impurity (e.g., the index-affecting impurity 16) is introduced into the second optical material structure to facilitate exhibition of an index anomaly (e.g., the index anomaly 106) corresponding to a change in index of refraction from the first index of refraction to a second index of refraction across a portion of the frequency spectrum and a change from the second index of refraction to the first index of refraction along the frequency spectrum. At 208, an optically-diffractive structure is formed on a surface of one of the first and second optical material structures. At 210, a complementary structure is formed on a surface of the other of the first and second optical material structures. At 212, the first and second optical material structures are joined via the surfaces of the first and second optical material structures to form a diffractive interface (e.g., the diffractive interface 18) between the first and second optical material structures.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for manufacturing an optical system, the method comprising:

providing a first optical material structure formed of a first substrate material and comprising a first index of refraction across a frequency spectrum;

providing a second optical material structure formed of the first substrate material;

introducing a first index-affecting impurity into the second optical material structure to facilitate exhibition of a first index anomaly corresponding to a change in index of refraction from the first index of refraction to a second index of refraction across a first portion of the frequency spectrum and a change from the second index of refraction to the first index of refraction along the frequency spectrum;

forming a first optically-diffractive structure on a surface of one of the first and second optical material structures;

forming a first complementary structure on a surface of the other of the first and second optical material structures;

joining the first and second optical material structures via the surfaces of the first and second optical material structures to form a first optical element comprising a first diffractive interface corresponding to a first non-planar material contact junction between the first and second optical material structures of the first optical element, the first diffractive interface being configured to manipulate in a predetermined manner an optical beam having an optical path through the first diffractive interface and having a frequency in the first portion of the frequency spectrum;

providing a third optical material structure formed of a second substrate material and comprising the first index of refraction across the frequency spectrum;

providing a fourth optical material structure of the second optical element, the fourth optical material structure being formed of the second substrate material;

introducing a second index-affecting impurity into the second optical material structure to facilitate exhibition of a second index anomaly corresponding to a change in index of refraction from the first index of refraction to a third index of refraction across a second portion of the frequency spectrum and a change from the third index of refraction to the first index of refraction along the frequency spectrum;

forming a second optically-diffractive structure on a surface of one of the third and fourth optical material structures;

forming a second complementary structure on a surface of the other of the third and fourth optical material structures;

joining the third and fourth optical material structures via the surfaces of the third and fourth optical material structures to form a second optical element comprising a second diffractive interface corresponding to a second non-planar material contact junction between the third and fourth optical material structures of the second optical element, the second diffractive interface being configured to manipulate in a predetermined manner the optical beam having the optical path through the second diffractive interface and having a frequency in the second portion of the frequency spectrum.

2. The method of claim 1, wherein introducing at least one of the first index-affecting impurity and the second index-affecting impurity comprises doping the respective at least one of the first substrate material of the second optical material structure and the second substrate material of the fourth optical material structure with the index-affecting impurity.

3. The method of claim 1, wherein forming at least one of the first optically-diffractive structure and the second optically-diffractive structure comprises etching one of a diffractive optical element, a holographic optical element, a polarizer, or an optical grating onto the surface of the respective at least one of the second optical material structure and the fourth optical material structure.

4. The method of claim 1, wherein forming at least one of the first complementary structure and the second complementary structure comprises sputtering the respective at least one of the other of the first and second optical material structures onto the first optically-diffractive structure on the surface of the given one of the first and second optical material structures and the other of the third and fourth optical material structures onto the second optically-diffractive structure on the surface of the given one of the third and fourth optical material structures.

5. The method of claim 1, wherein forming at least one of the first optically-diffractive structure and the second optically-diffractive structure comprises forming the at least one of the first optically-diffractive structure and the second optically-diffractive structure to provide a diffraction efficiency greater than a predetermined threshold across the second portion of the frequency spectrum defining a diffractive bandpass of the respective one of the first diffractive interface and the second diffractive interface, the method further comprising matching the diffractive bandpass to the first portion of the frequency spectrum.

6. An optical system comprising:
a first optical element in an optical path of an optical beam, the first optical element comprising:
a first optical material structure comprising a first index of refraction across a frequency spectrum;
a second optical material structure configured to exhibit a first index anomaly corresponding to a change in index of refraction from the first index of refraction to a second index of refraction across a first portion of the frequency spectrum and a change from the second index of refraction to the first index of refraction along the frequency spectrum; and
a first diffractive interface corresponding to a first non-planar material contact junction between the first optical material structure and the second optical material structure, the first diffractive interface being configured to manipulate in a predetermined manner the optical beam and having a frequency in the first portion of the frequency spectrum; and a second optical element in the optical path of the optical beam, the second optical element comprising:
a third optical material structure comprising the first index of refraction across the frequency spectrum;
a fourth optical material structure configured to exhibit a second index anomaly corresponding to a change in index of refraction from the first index of refraction to a third index of refraction across a second portion of the frequency spectrum and a change from the third index of refraction to the first index of refraction along the frequency spectrum; and
a second diffractive interface corresponding to a second non-planar material contact junction between the third optical material structure and the fourth optical material structure, the second diffractive interface being configured to manipulate in a predetermined manner the optical beam and having a frequency in the second portion of the frequency spectrum.

7. The system of claim 6, wherein the first optical material structure and the second optical material structure each comprise a first same substrate material, wherein the third optical material structure and the fourth optical material structure each comprise a second same substrate material, wherein the second optical material structure comprises a first index-affecting impurity configured to facilitate exhibition of the index anomaly with respect to the second optical material structure, wherein the fourth optical material structure comprises a second index-affecting impurity configured to facilitate exhibition of the index anomaly with respect to the fourth optical material structure.

8. The element of claim 7, wherein the first index-affecting impurity is a dye incorporated into the first same substrate material of the second optical material structure.

9. The element of claim 7, wherein the first index-affecting impurity is an ion implantation incorporated into the first same substrate material of the second optical material structure.

10. The system of claim 6, wherein the first diffractive interface corresponds to a first optical control structure patterned onto a surface of one of the first and second optical material structures and a complementary optical control structure patterned onto an opposing surface of the other one of the first and second optical material structures, wherein the second diffractive interface corresponds to a second optical control structure patterned onto a surface of one of the third and fourth optical material structures and a complementary optical control structure patterned onto an opposing surface of the other one of the third and fourth optical material structures.

11. The system of claim 6, wherein the first diffractive interface is designed to provide a diffraction efficiency greater than a first predetermined threshold across a first diffractive bandpass that is approximately the same as the first portion of the frequency spectrum, wherein the second diffractive interface is designed to provide a diffraction efficiency greater than a second predetermined threshold across a second diffractive bandpass that is approximately the same as the second portion of the frequency spectrum.

12. The element of claim 6, wherein at least one of the first diffractive interface and the second diffractive interface corresponds to one of a diffractive optical element, a holographic optical element, a polarizer, or a lens.

13. The element of claim 6, wherein at least one of the first diffractive interface and the second diffractive interface is an occulting mask.

14. The element of claim 6, wherein at least one of the first diffractive interface and the second diffractive interface comprises a structured anti-reflection coating.

15. The element of claim 6, wherein at least one of the first diffractive interface and the second diffractive interface is defined by physical optics to manipulate the optical beam in the predetermined manner.

16. The element of claim 7, wherein at least one of the first index-affecting impurity and the second index-affecting impurity is a spectral absorbing nano particle, the density of which determines spectral absorptivity of the respective at least one of the second optical material structure and the fourth optical material structure.

17. An optical element comprising:
   a plurality of optical substrate pairs comprising a respective plurality of complementary geometric beam control interfaces therebetween, each of the optical substrate pairs comprising:
      a first optical substrate with a predetermined index of refraction dispersion curve over a first transmissive spectral range;
      a second optical substrate which exhibits an index anomaly relative to the first substrate over a second transmissive spectral range within the first transmissive spectral range, the second optical substrate having an approximately same dispersion as the first optical substrate outside of the second transmissive spectral range; and
      a complementary geometric beam control interface between the first and second optical substrates corresponding to a non-planar material contact junction between the first optical material structure and the second optical material structure, the complementary geometric beam control interface being configured to manipulate in a predetermined manner an optical beam having an optical path through the interface;
   wherein the second transmissive spectral range associated with each of the plurality of optical substrate pairs is non-overlapping with the second transmissive spectral range of each other one of the optical substrate pairs.

18. The element of claim 17, wherein the first optical substrate and the second optical substrate each comprise a same substrate material, wherein the second optical substrate comprises an index-affecting impurity configured to facilitate exhibition of the index anomaly with respect to the second optical substrate.

19. The element of claim 18, wherein the index-affecting impurity is a dopant material incorporated into the second optical substrate.

20. The element of claim 17, wherein the complementary geometric beam control interface corresponds to an optical control structure patterned onto a surface of one of the first and second optical substrates and a complementary optical control structure patterned onto an opposing surface of the other one of the first and second optical substrates.

21. The element of claim 17, wherein the complementary geometric beam control interface is designed to provide a diffraction efficiency greater than a predetermined threshold across a diffractive bandpass that is approximately the same as the second transmissive spectral range.

22. The element of claim 21, wherein the predetermined threshold of the diffraction efficiency is greater than or equal to approximately 95%.

23. An optical system comprising the optical element of claim 17, wherein the optical element is a first optical element, the optical system further comprising a second optical element in the optical path of the optical beam.

\* \* \* \* \*